J. HYSLOP, Jr.
Machines for Making Metallic Shoe-Shanks.
No. 5,197. Reissued Dec. 24, 1872.
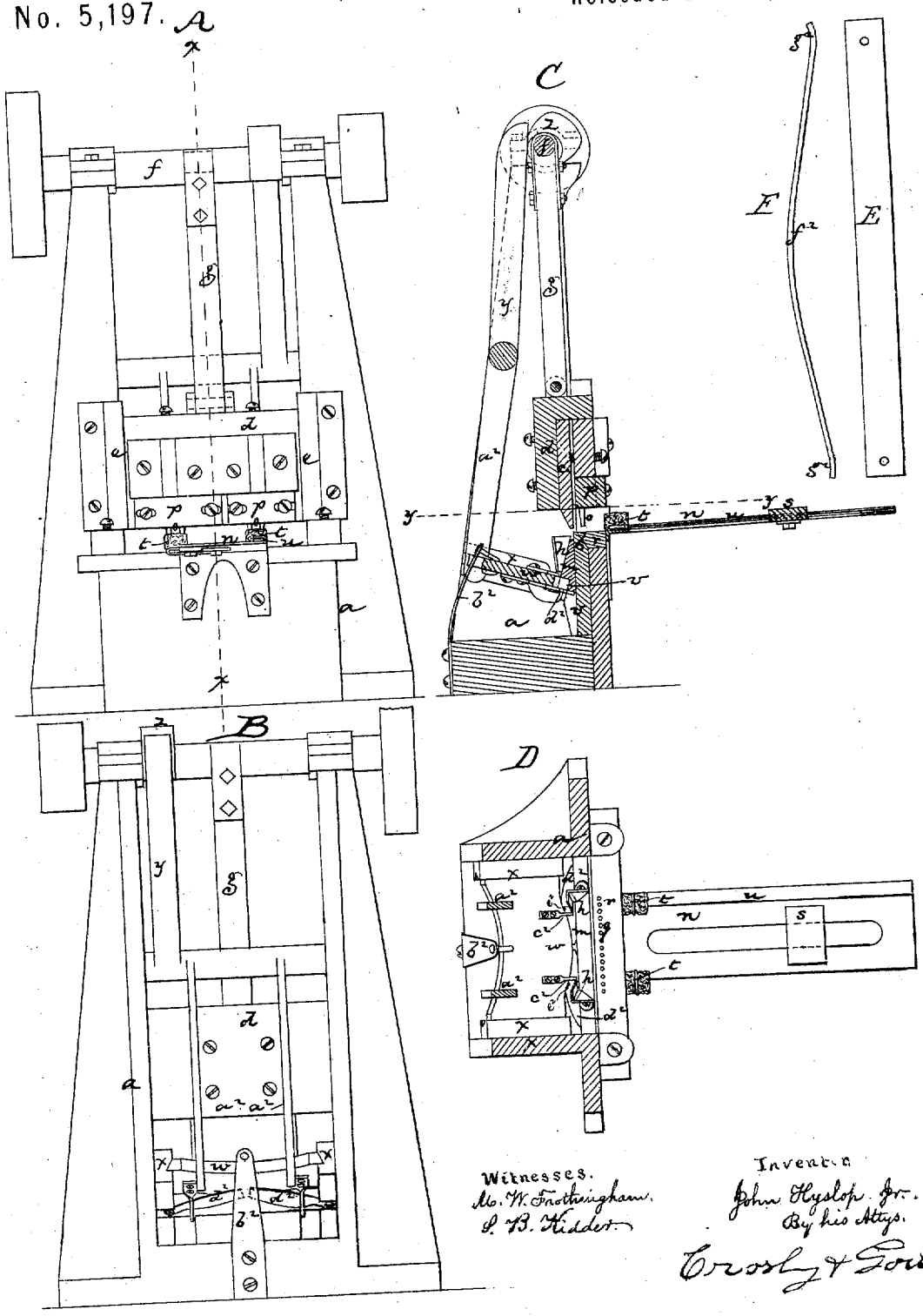
Witnesses.
Mo. W. Frothingham.
S. B. Hidden
Inventor
John Hyslop, Jr.
By his Attys.
Crosby & Gerhardt
AM. PHOTO-LITHOGRAPHIC CO. N.Y. (OSBORNE'S PROCESS.)

UNITED STATES PATENT OFFICE.

JOHN HYSLOP, JR., OF ABINGTON, MASSACHUSETTS, ASSIGNOR TO OTIS MONRO HOLBROOK, OF SAME PLACE.

IMPROVEMENT IN MACHINES FOR MAKING METALLIC SHOE-SHANKS.

Specification forming part of Letters Patent No. 129,347, dated July 16, 1872; reissue No. 5,197, dated December 24, 1872.

*To all whom it may concern:*

Be it known that I, JOHN HYSLOP, Jr., of Abington, in the county of Plymouth and State of Massachusetts, have invented a new and useful Improvement in the Manufacture of Metal Shoe-Shanks, of which the following is a specification:

The invention relates to the organization of a machine by which, from sheet-steel or other metal of requisite width, metal shanks for boots and shoes are cut, punched, and bent, and have their opposite ends reverse bent, the operations being continuous or automatically successive; and the invention consists in the combination and arrangement of mechanism for cutting, punching, and bending shoe-shanks.

The drawing represents a machine embodying my invention.

A shows the machine in front elevation. B is a rear elevation thereof. C is a vertical section on the line *x x*. D is a horizontal section on the line *y y*. E and F are views of one of the shanks.

*a* denotes a strong upright frame, in which is supported a bed or bed-cutter, *b*, the rear edge of said bed being the stationary cutter, in connection with which a vertically-reciprocating cutter, *c*, acts to shear the sheet or sever from its front end the shank-forming strip. This cutter is fixed to a head, *d*, sliding vertically in suitable guide-ways *e*, and actuated from an eccentric on a driving-shaft, *f*, by connection therewith by a link, *g*. In rear of the bed *b* are lips or flanges *h*, against which the front edge of the plate is held to gage the cut, and when the blank is cut it falls down an incline, *m*, and is guided by the lips *h* so that it drops into such position as to be properly presented to the action of the shaping mechanism. The plate to be cut is fed to the action of the cutter over a guide-table, *n*, by the agency of a weight or other suitable mechanism, and, before being cut, each shank-forming end is presented to the action of punches for punching holes in its opposite ends, the punches *o* extending down from punch-blocks *p*, and entering holes *q* in a bed-piece, *r*, over which the plate passes. The plate is pressed up by a follower, *s*, and before passing under the punches the edges pass under sponges *t*, which are saturated with oil, and lubricate the plate at the points where the punches are to operate. When the cutter descends to cut a strip from the end of the plate, the punches descend and punch the holes in the part of the metal from which the next blank will be cut, the punch-blocks being fixed to the same head that carries the cutter. One edge of the guide-table *n* is made with a lip, *u*, to guide or gage the plate, and the distance from the end at which one of the punch-holes is made, the punch-block *p* being fixed; but the other punch-block, by means of suitable screws and slots, is made adjustable, thus making provision for relative adjustment between the punches in accordance with the varying sizes or lengths of shanks to be formed at different times. Under the incline *m*, down which the punched and severed blank slides, is a concave face, *v*, in front of which is a reciprocating convex-faced bender-plate, *w*, sliding in guide-ways *x*, and having movement imparted to it by a lever, one arm, *y*, of which is in contact with a cam, *z*, on the shaft *f*, while the other arm $a^2$ acts against the bender-plate to drive it forward, the plate being drawn back by a spring, $b^2$. As the shaft turns the cutters first sever a blank from the end of a plate, and the severed blank slides down the incline and is arrested by stop-pins $c^2$, and the continued rotation of the shaft then carries the bender-plate forward, causing it to bend the previous shank into the concavity. When the bender is drawn back the pins permit the shank-blank to fall by them, and the blank lodges upon plate $d^2$, the previously-bent shank having fallen by said plates, and the blank is then ready for the action of the bender-plate, which advances and presses the shank into the concavity, thereby imparting to it its long longitudinal bend. Extending from the bender-plate are two pins, $e^2$, which, when the bender advances, strike the ends of the blank and form the reverse bends at the end thereof. To center the shank previous to the action of the bender-plate and pins, so that the pins shall operate at the right points, the guides *h* incline inward, and their lower ends are placed at a distance apart equal to the length of the shanks, these lips being adjustable as to distance apart for various lengths of shanks. When the bender is drawn back the stopplates $d^2$ are swung back, and the finished shank drops from the machine.

The shank thus made may be of uniform breadth, as seen at E, or may be made wider at one end than at the other; and by the action of the machine the shanks are not only cut off from the strip one by one, but each is punched, as seen at E, and formed with the long bend $f^2$ and the two reverse bends $g^2$ at the opposite ends; and by the machine, organized as shown, the shanks may be rapidly, perfectly, and inexpensively produced.

Having thus described my invention, I claim as new and desire to secure by Letters Patent—

1. The combination of the punching mechanism, the cutting mechanism, and the bending mechanism, arranged to operate substantially as described.

2. The arrangement of a fixed or stationary bending-die and a movable bending-die of suitable form for bending a plate to form the middle curve of a shoe-shank, and actuating devices therefor, in a machine adapted for cutting and punching said blanks, in such manner that the blanks are received in the bending-dies from the cutting devices, and bent and discharged automatically, substantially as specified.

3. The said bending-dies, constructed and arranged to form the middle bend and the reverse bends by one and the same operation of the dies, substantially as specified.

JOHN HYSLOP, JR.

Witnesses:
JAMES WASHBURN,
WILLIAM H. H. HALL.